United States Patent
Park et al.

(10) Patent No.: US 9,978,061 B2
(45) Date of Patent: May 22, 2018

(54) METHOD FOR PROCESSING TRANSACTION USING DYNAMIC PAN

(71) Applicants: Shinhancard Co., Ltd., Seoul (KR); KB Kookmincard Co., Ltd., Seoul (KR); Hyundai Card Co., Ltd., Seoul (KR); Samsung Card Co., Ltd., Seoul (KR); Lotte Card Co., Ltd., Seoul (KR); Nonghyup Bank, Seoul (KR)

(72) Inventors: Hae Chul Park, Seoul (KR); Byungsoo Kim, Seoul (KR); Jeongjin Lee, Seoul (KR)

(73) Assignees: SHINHANCARD CO., LTD., Seoul (KR); KB KOOKMINCARD CO., LTD., Seoul (KR); HYUNDAI CARD CO., LTD., Seoul (KR); SAMSUNG CARD CO., LTD., Seoul (KR); LOTTE CARD CO., LTD., Seoul (KR); NONGHYUP BANK, Seoul (KR)

( * ) Notice: Subject to any disclaimer, the term of this patent is extended or adjusted under 35 U.S.C. 154(b) by 406 days.

(21) Appl. No.: 14/646,303

(22) PCT Filed: Dec. 28, 2012

(86) PCT No.: PCT/KR2012/011693
§ 371 (c)(1),
(2) Date: May 20, 2015

(87) PCT Pub. No.: WO2014/081075
PCT Pub. Date: May 30, 2014

(65) Prior Publication Data
US 2015/0317632 A1    Nov. 5, 2015

(30) Foreign Application Priority Data
Nov. 23, 2012   (KR) .................. 10-2012-0133946

(51) Int. Cl.
*G06Q 40/00*     (2012.01)
*G06Q 20/38*     (2012.01)
*G06Q 20/40*     (2012.01)

(52) U.S. Cl.
CPC .......... *G06Q 20/38* (2013.01); *G06Q 20/382* (2013.01); *G06Q 20/385* (2013.01); *G06Q 20/40* (2013.01); *G06Q 20/401* (2013.01)

(58) Field of Classification Search
CPC ........ G06Q 20/20; G06Q 20/401; G07F 7/10; G07F 7/12
(Continued)

(56) References Cited

U.S. PATENT DOCUMENTS

2015/0242853 A1*  8/2015  Powell ................ G06Q 20/385
                                                                  705/44

FOREIGN PATENT DOCUMENTS

KR    10-2006-0103152    9/2006
KR    10-2007-0041576    4/2007
(Continued)

OTHER PUBLICATIONS

International Search Report for PCT/KR2012/011693, dated Jun. 28, 2013.

*Primary Examiner* — Jamara Franklin
(74) *Attorney, Agent, or Firm* — Locke Lord LLP; Christopher J. Capelli; Judy R. Naamat

(57) ABSTRACT

A method for processing a transaction using a dynamic PAN (Primary Account Number), performed by a payment device that provides a card reader with ISO (International Standardization Organization) standards of track 2 information. A PAN area of the track 2 information is divided into a first area, in which a BIN (Bank Information Number) is included, and a second area, in which the BIN is not included. A dynamic area is formed by encrypting the
(Continued)

second area and a dynamic PAN area is formed by combining the first area with the dynamic area. Track 2 information (which includes the dynamic PAN area) is provided to the card reader.

18 Claims, 8 Drawing Sheets

(58) Field of Classification Search
 USPC ..... 235/379, 380; 705/41, 44, 67, 71, 75, 76
 See application file for complete search history.

(56) References Cited

FOREIGN PATENT DOCUMENTS

| | | |
|---|---|---|
| KR | 10-2009-0036560 A | 4/2009 |
| KR | 10-2009-0102752 A | 9/2009 |

\* cited by examiner

METHOD FOR PROCESSING TRANSACTION USING DYNAMIC PAN

TECHNICAL FIELD

The present invention generally relates to a transaction processing method. More particularly, the present invention relates to a method for processing a transaction using a dynamic PAN that dynamically changes to enhance security and enables using existing card readers and relay servers.

BACKGROUND ART

These days, magnetic credit cards having a magnetic strip (MS) are used as the most common payment means. Magnetic credit cards include International Standardization Organization (ISO) standards of track 2 information. When a credit card including track 2 information is touched on a card reader, the card reader reads the track 2 information recorded in a magnetic strip and provides it to a finance company server such as a Value Added Network (VAN) server or a card company server, whereby a transaction for the credit card is processed.

Track 2 information included in a magnetic strip has a Primary Account Number (PAN) area for identifying a card, and the PAN area includes information about a finance company server that processes the credit card transaction.

Track 2 information is composed of a PAN area, an Expiration Date (ED) area, a Service Code (SC) area, and a Discretionary Data (DD) area, and the PAN area includes a Bank Information Number (BIN) for identifying a finance company. The BIN can be used to determine a target that processes a credit card transaction, such as a VAN server or a card company server.

However, because track 2 information recorded in a magnetic strip has a static value, there exists a risk of forgery or falsification. Also, while the track 2 information is transmitted from a card reader to a finance company server, it can be exposed outside. To reduce the risk of forgery or falsification, an electronic credit card in which an Integrated Circuit (IC) is embedded has been proposed. Electronic credit cards can generate a dynamic encryption value using an embedded IC, but in order to generate the dynamic encryption value, not only the electronic credit cards having the IC but also a card reader obtaining track 2 information from the electronic credit cards should be able to perform an encryption function. That is because existing transaction processing methods are performed in an infrastructure that is arranged for supporting payment of credit cards having a magnetic strip, and changing the infrastructure or constructing an additional infrastructure can be costly.

To solve the above problems, PCT application WO 2003/081832 discloses a method and system for conducting a transaction using a proximity device that improves security of a credit card having an existing magnetic strip by recording a dynamic authentication code in a DD area of track 2 information, which includes a PAN area, an ED area, an SC area, and the DD area, and by conducting a transaction using the dynamic authentication code.

FIG. 1 illustrates a concept diagram for a transaction conducting method of WO 2003/081832. Referring to FIG. 1, track 2 information is provided from a proximity device 10 to a reader 20. In this case, the proximity device 10 may generate a first authentication value in a DD area (optional area) of the track 2 information that is provided to the reader 20.

The first authentication value mentioned in WO 2003/081832 indicates a random authentication value recorded in the DD area.

Also, a second authentication value mentioned in WO 2003/081832 may mean a part of credit card numbers that are printed on the back of the card.

The reader 20 provides the first authentication value, which is provided by the proximity device 10, to a credit card issuer 30, and the credit card issuer 30 derives the second authentication value from the first authentication value. Then, when the first authentication value corresponds to the second authentication value as a result of comparison of the two values, the credit card issuer 30 completes the authentication, whereas when the two values do not correspond, the credit card issuer 30 determines that the authentication fails.

Basically, WO 2003/081832 tends to determine that security of the proximity device 10 is more reliable than that of the reader 20 obtaining track 2 information from a credit card. Accordingly, the proximity device 10 has hardware and software structures for generating the first authentication value.

WO 2003/081832 is advantageous in that a transaction system using a magnetic strip can be used because a dynamic authentication value is recorded in a user-defined DD area and a transaction is conducted using the recorded dynamic authentication value. However, in the case of a transaction system in Korea, which uses a Value Added Network (VAN) server, the dynamic authentication value proposed in WO 2003/081832 requires that the VAN server should perform decryption of a card number. Therefore, in the VAN server, system development and maintenance is required for decryption of the card number, and the VAN server needs to arrange an encryption key for decrypting the dynamically encrypted card number.

The encryption key should be provided from a card company server to a VAN server, and maintaining the encryption key in two or more servers (a VAN server and a card company server) can lead to security vulnerability.

DISCLOSURE

Technical Problem

An object of the present invention is to provide a method for processing a transaction using a dynamic PAN, which enhances security in payment by credit cards, minimizes the exposure of finance information, and maximizes the use of an existing payment system.

Technical Solution

According to the present invention, the above object is accomplished by a method for processing a transaction using a dynamic PAN, which is performed by a payment device that provides a card reader with ISO (International Standardization Organization) standards of track 2 information, the method including: dividing a PAN (Primary Account Number) area of the track 2 information into a first area, in which a BIN (Bank Information Number) is included, and a second area, in which the BIN is not included; forming a dynamic area by encrypting the second area; forming a dynamic PAN area by combining the first area with the dynamic area; and providing track 2 information including the dynamic PAN area to the card reader.

Advantageous Effects

According to the present invention, changes in existing infrastructures including a card reader, a VAN server, and a card company server can be minimized, and transaction security of a magnetic strip card and payment devices such as an IC card and a portable terminal can be improved.

DESCRIPTION OF DRAWINGS

FIG. 3 illustrates a reference view for a structure of a dynamic PAN according to the present invention;

Figure 1:
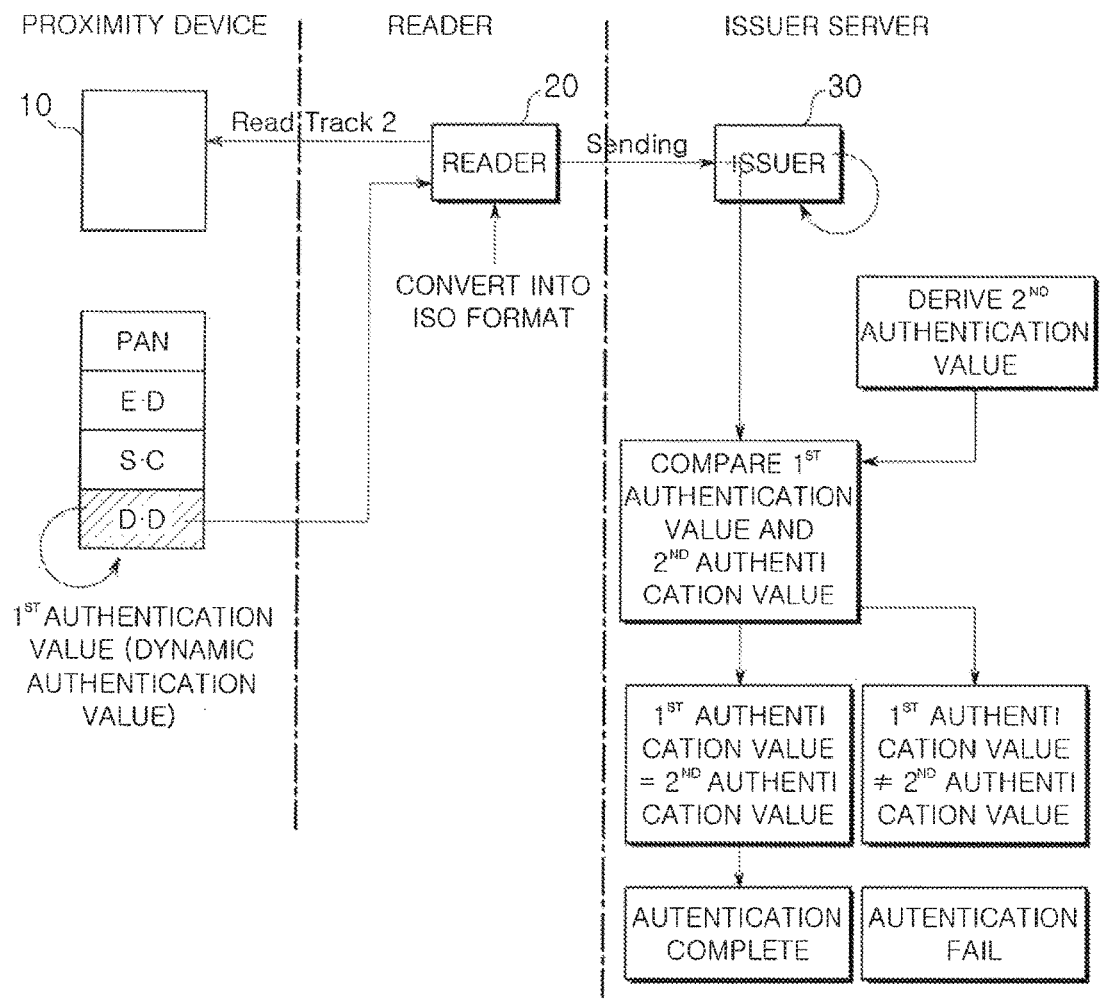
FIG. 1 illustrates a concept diagram for a transaction conducting method of WO 2003/081832.

<20: card reader>
<50: payment device>
<100: card company server>
<150: relay server>

BEST MODE

"A payment device" mentioned herein includes track 2 information and may be any one of an electronic credit card in which an IC chip is embedded and a portable device having a Universal Subscriber Identity Module (USIM) chip. However, in addition to the above-mentioned electronic credit card and portable terminal, anything that includes track 2 information and provides the track 2 information to a card reader to enable a transaction in the card reader can be referred to a payment device. The payment device can be touched on or placed close to the card reader.

Here, track 2 information may mean information according to ISO/IEC 7813 standards.

ISO/IEC 7813 standards can be referred to for additionally required information about a structure and functions of track 2 information in this specification.

Track 2 information according to ISO/IEC 7813 may include a Primary Account Number (PAN) area, an Expiration Date (ED) area, a Service Code (SC) area, and a Discretionary Data (DD) area.

"A card reader" mentioned herein may mean a device capable of processing a transaction by obtaining track 2 information from an electronic credit card in which an IC is embedded and from a portable terminal in which an USIM chip is embedded. Besides, a card reader may be a device that can obtain track 2 information by contacting with a magnetic credit card having a magnetic strip.

Here, the card reader may process a transaction with only one selected from among a magnetic credit card, an electronic credit card, and a portable terminal or it may process a transaction with two or three among them. However, the card reader is not limited to the above description.

NFC mentioned herein is an acronym for Near Field Communication. An NFC-enabled chip can be embedded in a smart phone and a mobile phone, and it can be mounted separate from a USIM chip or can be integrated with a USIM chip.

In this specification, a portable terminal is described and explained mainly with a smart phone and a mobile phone. However, in addition to the smart phone and mobile phone, a portable device in which a USIM chip can be embedded and track 2 information can be transmitted to a card reader using NFC may be referred to a portable terminal, without specific mention.

A part of (or the whole) PAN area mentioned herein may indicate a sequence of numbers embossed or engraved on a surface of a magnetic credit card or an electronic credit card.

In the PAN area, information about a BIN and a card number consists of 16 digits of numbers. The first 8 digits may correspond to the BIN and the next 8 digits may correspond to the card number.

A relay server mentioned herein may be a Value Added Network (VAN) server that collects and manages sales statements on behalf of card companies each when a card reader transmits payment data to a card company server, and that identifies card company information in the payment data transmitted from the card reader and provides the payment data to the corresponding card company server.

Hereinafter, the present invention is described in detail referring to the drawings.

Figure 2:
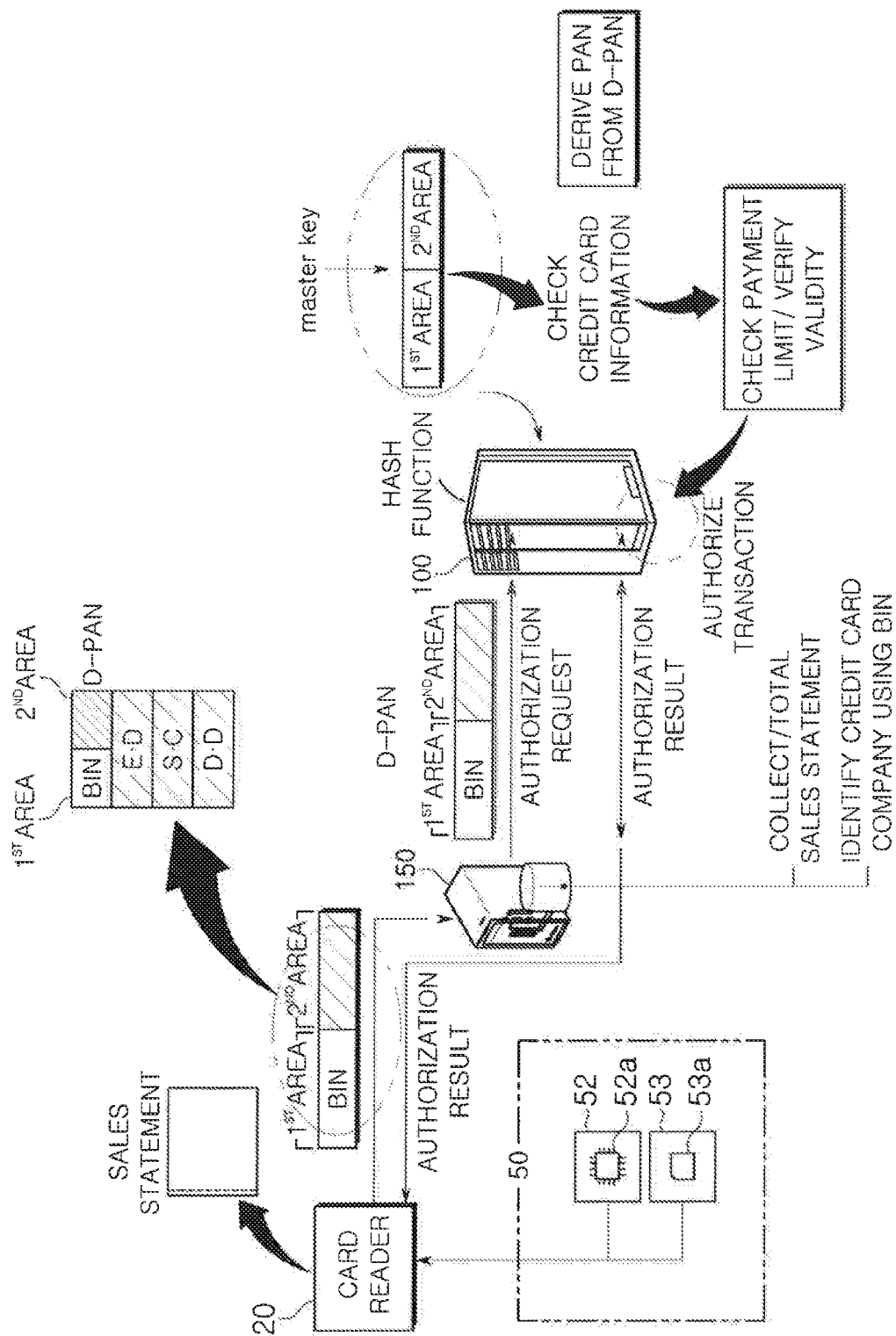
FIG. 2 illustrates a concept diagram for a transaction processing method using a dynamic PAN according to an embodiment of the present invention.

FIG. 2 illustrates a concept diagram for a transaction processing method using a dynamic PAN according to an embodiment of the present invention.

Referring to FIG. 2, the transaction processing method using a dynamic PAN according to the embodiment implements a transaction processing method that has enhanced security and that may use existing infrastructures without changes because a card reader 20 generates a dynamic PAN for track 2 information when a payment device 50 provides the unencrypted and unaltered track 2 information to the card reader 20, and a transaction is processed using the dynamic PAN.

If a payment device 50 is an electronic credit card or a portable terminal having a USIM chip, track 2 information is provided to a card reader 20 when the payment device 50 is placed close to (or contacted with) the card reader 20. In other words, when the payment device 50 is placed close to (or contacted with) the card reader, the card reader 20 generates a command for reading the track 2 information. Then, the card reader may request and obtain the track 2 information by transmitting the command to the payment device 50.

The card reader 20 may divide a PAN area of the track 2 information obtained from the payment device 50 into a first area, in which a BIN is included, and a second area, in which the BIN is not included.

A card reader 20 can obtain track 2 information by being contacted with or in proximity to various types of payment devices.

For example, a card reader 20 may obtain track 2 information by being contacted with any one of an electronic credit card 52 and a portable terminal 53, or by a wireless communication when the card reader 20 is placed close to any one of the electronic credit card 52 and the portable terminal 53.

A card reader 20 may obtain track 2 information by performing wireless local area communication with an IC chip 52a embedded in an electronic credit card 52. Also, the card reader 20 performs data communication with a USIM chip 53a, which is embedded in a portable terminal 53, through Near Field Communication (NFC), and may obtain track 2 information through the USIM chip 53a. In this case, the card reader 20 should have an NFC function for wireless local area communication with the portable terminal 53.

A card reader 20 may perform data communication with any one of an electronic credit card 52 and a portable terminal 53, or it may be a device capable of performing data communication with both an electronic credit card 52 and a portable terminal 53. However, the card reader 52 is not limited to the above description.

A card reader 20 selects a PAN area in the track 2 information obtained from the payment device 51, 52, or 53, and may divide the PAN area into a first area and a second area.

Figures 2A, 4:
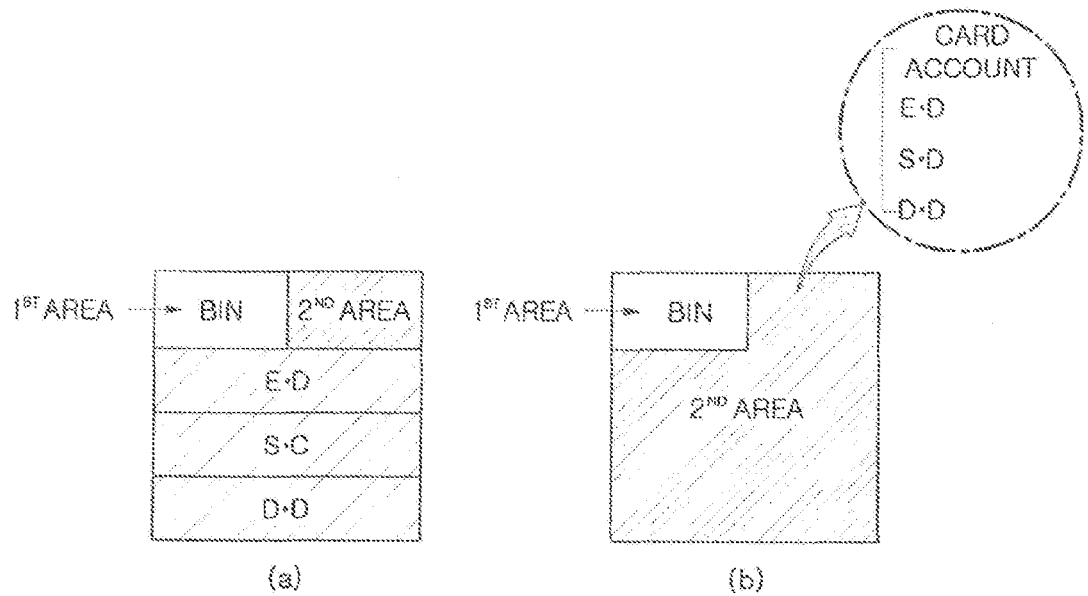
FIG. 2A illustrates a table representing example card company information with BIN information.
FIG. 4 illustrates a reference view for a method for forming a second area in a PAN area.
Figures 2A, 4:
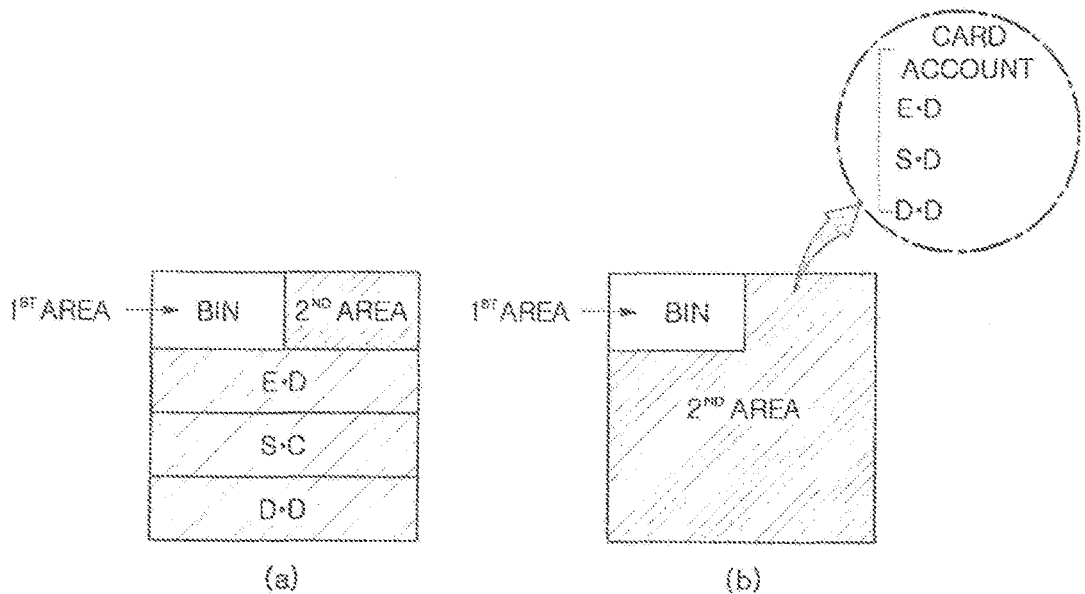

In the first area that is divided by the card reader 20, a BIN is located. The BIN is a sequence of numbers, which ranges from 4 to 10 digits, and used to indicate a finance company such as a card company and a bank. FIG. 2A shows a table 200 that represents an example in which a sequence of numbers forming the BIN indicates a finance company in Korea.

As illustrated in table 200, in Korea, a BIN identifies a credit card company using first 4 bytes, and the next 2 bytes can be used or not according to the need. Using the 6 digits of BIN, a relay server 150 or a card company server 100 can determine a credit card type, and a country and finance company that issue a credit card (or a finance chip corresponding to a credit card) for a payment device having the BIN.

In table 200, finance companies are distinguished using the first six digits of a sequence of numbers forming the BIN. In table 200, Shinhan card, BC card, Samsung card, Kookmin card, and Hyundai card each use a different 6 numbers. Also, when a payment device processes a transaction, the BIN can indicate a payment method, for example, the payment device makes either prepayment or deferred payment, or the payment device is used as a debit card.

In this embodiment, a first area including a BIN is unencrypted and unaltered. Because the first area is unencrypted and unaltered, the BIN is maintained in track 2 information that is provided to a card reader 20 when a payment device 50 is placed close to (touched on) the card reader 20. Here, that the BIN is maintained means that the BIN is provided to a relay server 150 or a card company server 100 without changes. Accordingly, using the BIN provided by the card reader 20, the relay server 150 or the card company server 100 can precisely determine which card company server processes the payment. Therefore, the relay server 150 does not require decryption of the first area to determine the target that processes the payment. Also, the relay server 150 does not need an encryption key provided by a card company server 100.

Accordingly, because a relay server 150, which is one of existing transaction processing infrastructures, does not need to decrypt a dynamic PAN, changes in system of the relay server 150 are not required.

Also, the relay server 150 does not need to perform an additional decryption process to extract the BIN.

Such advantages are prominent in that the relay server 150 or the card company server 100 does not need to decrypt a dynamically changed PAN area to find out a card company server that processes a transaction though the PAN area of a payment device 50 is dynamically changed.

Also, the relay server 150 does not need to develop and maintain an additional system for decrypting the PAN area.

The second area, which is the remaining PAN area excluding the BIN, can be dynamically encrypted or changed by a card reader 20. Using a random value that is randomly generated according to the time when the payment device 50 requests processing of a transaction, and using an Application Transaction Count (ATC) of the payment device 50, the card reader 20 may encrypt or change information of the second area into a value that dynamically changes whenever a transaction is processed.

An ATC is a number that is assigned to a payment device by a card company server 100 whenever the payment device 10 requests payment from the card company sever 100. Whenever receiving a payment request from multiple payment devices, the card company server 100 assigns a number for the payment request to manage it, and the ATC is referred to the number.

The second area can be encrypted according to any one of encryption algorithms including Advanced Encryption Standard (AES), Rivest, Shamir, Adleman (RSA), Data Encryption Standard (DES), Triple DES (TDES), and Academy Research Institute Agency (ARIA). When an encryption method is not specified in this specification, it means that one algorithm can be applied among AES, RSA, DES, TDES, and ARIA.

For the second area, time information when a payment device 50 triggers a transaction, information of the second area, and an ATC can be used as input variables of an encryption algorithm, and values in an ED area, an SC area, and a DD area can be encrypted together. Among information of the PAN area, information about a card company that processes a transaction is exposed, and the remaining information is encrypted (or altered). Accordingly, among credit card account information within a payment device 50, the remaining information excluding a BIN that indicates information about a card company is encrypted using an encryption algorithm and the second area can be decrypted in the card company server 100. In this case, if a method for encrypting the second area is DES or IDES, the card company server 100 can decrypt the encrypted second area by executing a hash function using a master key for the decryption.

Therefore, the encrypted second area cannot be exposed to others except for the card company server 100.

FIG. 3 illustrates a reference view for a structure of a dynamic PAN according to the present invention.

Referring to FIG. 3, in ISO/IEC 7813 standards of track 2 information that includes a PAN area, an ED area, an SC area, and a DD area, the PAN area is divided into a first area (BIN) and a second area (PAN-BIN) for a dynamic PAN. The first area (BIN) is an area that includes a BIN for identifying a card company, and its length can be 4 bytes to 10 bytes. The second area (PAN-BIN) is a remaining PAN area excluding the BIN, and it may include credit card account information given to a card reader 20. Here, the credit card account information may be a credit card number. In FIG. 3, the first area (BIN) of the PAN area has a static value. Also, the first area may mean first 8 digits of 16 digits of a card number that is embossed or engraved on the credit card.

In this case, the 16 digits of the card number are embossed on the surface of the credit card, or can be data recorded in a chip embedded in an electronic credit card. In the case of a portable terminal in which a USIM chip is embedded, the card number consisting of 16 digits of numbers can be stored in the USIM chip.

The second area (PAN-BIN) of the PAN area is a static value. However, the second area (PAN-BIN) can be changed to a dynamic value by an encryption algorithm executed by a payment device 50. In this case, the encryption algorithm executed by the payment device 50 is any one of AES, RSA, DES, IDES, and ARIA algorithm, and the description of the encryption algorithm is omitted hereinafter.

In other words, the dynamic PAN has a form in which the first area having a static value and the second area (PAN-BIN) encrypted by an encryption algorithm are combined. As illustrated in FIG. 3, a value of the second area (PAN-BIN) can be correctly calculated using a master key that is arranged in the card company server 100 and using a decryption function that decrypts the second area (PAN-BIN) using the master key.

If in the payment device 50, a method for encrypting the second area is either DES or IDES, the value of the second area can be correctly calculated only through a hash function that just needs a master key. Here, the master key can be arranged in the card company server 100.

When the second area (PAN-BIN) is encrypted, even if the dynamic PAN is exposed in the card reader 20 or exposed while the dynamic PAN is transmitted from the card reader 20 to the relay server 150, the second area cannot be decrypted without a master key arranged in the card company server 100 and the second area (PAN-BIN) cannot be decrypted by unauthorized parties unless they know the same algorithm as the algorithm (IDES algorithm) that the card company server 100 executes for decryption using the master key.

FIG. 4 illustrates a reference view for a method for forming a second area in a PAN area.

First, (a) of FIG. 4 illustrates an example in which a payment device 50 forms a second area of a PAN area.

In (a) of FIG. 4, track 2 information includes a PAN area, an ED area, a SC area, and a DD area, but a payment device 50 forms a second area only for the PAN area excluding a BIN and does not include the ED area, SC area, and DD area in the second area.

When the PAN is formed by such a method, a dynamic PAN can be formed using 16 digits of a card number that is embossed or engraved in a common credit card.

In (b) of FIG. 4, a payment device 50 includes a PAN area containing a card account of track 2 information, an ED area, an SC area, and a DD area in a second area, and may encrypt the second area by applying an encryption algorithm.

In the case of a dynamic PAN described in (a) and (b) of FIG. 4, because the first area in which a BIN is written is not encrypted, a relay server 150 does not need to use a decryption algorithm or a master key for decryption. Also, after receiving a payment request message provided by a card reader 20, the relay server 150 can immediately determine to which card company server to transmit the received payment request message referring to the unencrypted BIN.

Figure 5:
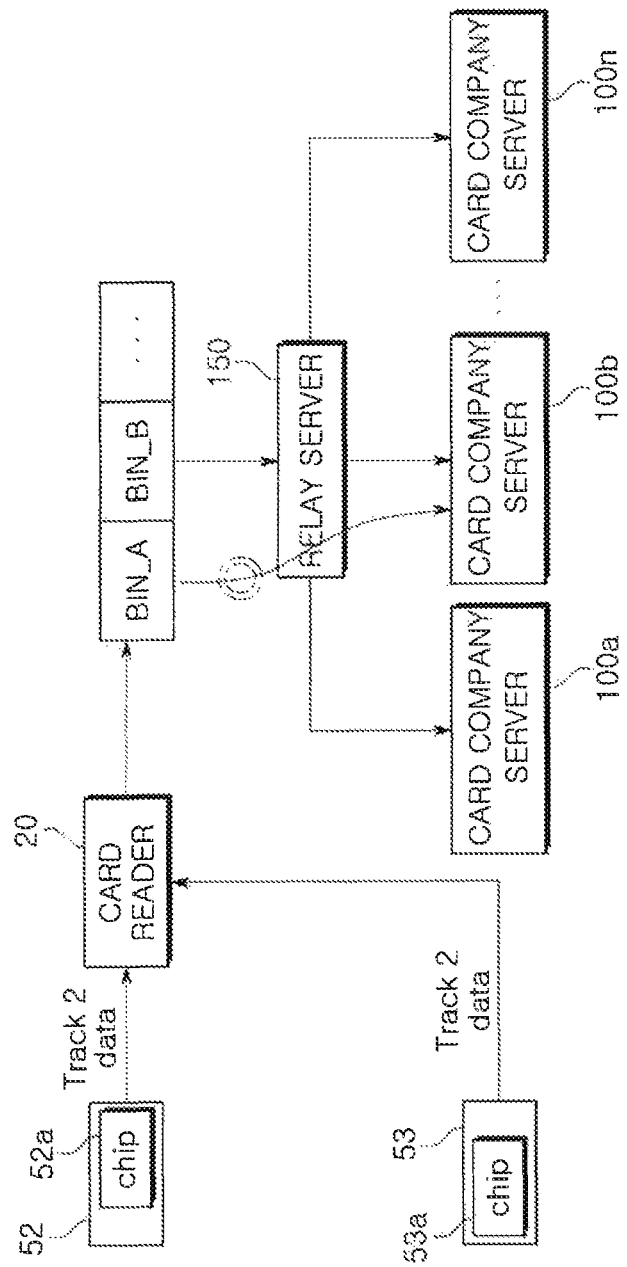
FIG. 5 illustrates a reference view for an example in which a transaction of a payment device is processed using a first area.

FIG. 5 illustrates a reference view for an example in which a transaction of a payment device is processed using a first area.

Referring to FIG. 5 and FIG. 2, if a payment device 50 is either an electronic credit card 52 in which an IC 52*a* is embedded or a portable terminal 53 having a USIM chip 53*a*, when the payment device 52 or 52 is touched on or placed close to a card reader 20, the card reader 20 obtains track 2 information from the payment device 52 or 53, reads a PAN area from the obtained track 2 information, and extracts a first area (BIN) from the PAN area. A dynamic PAN area includes the first area (BIN) and a second area (PAN-BIN). Here, the second area (PAN-BIN) means 1) an area that excludes the first area from a PAN area or 2) an area in which an ED area, an SC area, and a DD area are added to the second area (PAN-BIN).

In the case of 1), the second area (PAN-BIN) may mean only a credit card number area, but in the case of 2), the second area (PAN-BIN) may mean a remaining area that excludes a BIN from track 2 information (including an ED area, a SC area, and a DD area)

Regardless of the type of the second area (PAN-BIN) that can be any one of the above-described 1) or 2), the first area (BIN) is a static value and the value ranging from 4 bytes to 10 bytes is exposed to a card reader 20.

The card reader 20 can provide the first area (BIN) to a relay server 150. The relay server 150 may not be required for payment of a credit card, and card company servers 100*a* to 100*n* can be directly connected by a network to the card reader 20. However, the connection of the card reader is not limited to the above description.

Across the present invention, a relay server 150 can be omitted. The relay server 150 is arranged between a card reader 20 and a card company server 100 to match payment devices 52 and 53 that trigger a transaction with card company servers 100*a* to 100*n*.

When the card reader 20 transmits a BIN included in the first area to the relay server 150, the relay server 150 determines which card company server (any one among 100*a* to 100*n*) the payment devices 52 and 53 are matched to with reference to the transmitted BIN. As a result of the determination, when the BIN indicates a card company server 100*b*, the relay server can provides the card company server 100*b* with the first area provided by the card reader 20 and the remaining track 2 information excluding the first area (BIN).

Figure 6:
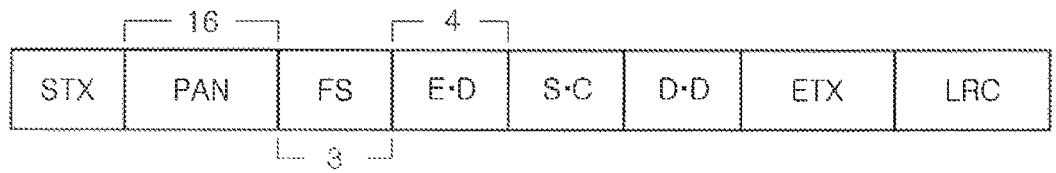
FIG. 6 illustrates a reference view for a structure of dynamic track 2 information according to the present invention.

FIG. 6 illustrates a reference view for a structure of dynamic track 2 information according to the present invention.

Referring to FIG. 6, track 2 information arranges "STX" that is a string for detecting the start of the track 2 information, a Primary Account Number (PAN) area that consists of 16 bytes and includes credit card account information and a BIN, a separator "FS" for separating the PAN area from another area, an Expiration Date (ED) area for indicating expiration date information, a Service Code (SC) area for indicating a service code, a Discretionary Data (DD) area, ETX that is a string for detecting the end of the track 2 information, and Longitudinal Redundancy Check (LRC) that is allocated for a checksum of the track 2 information.

Figure 7:
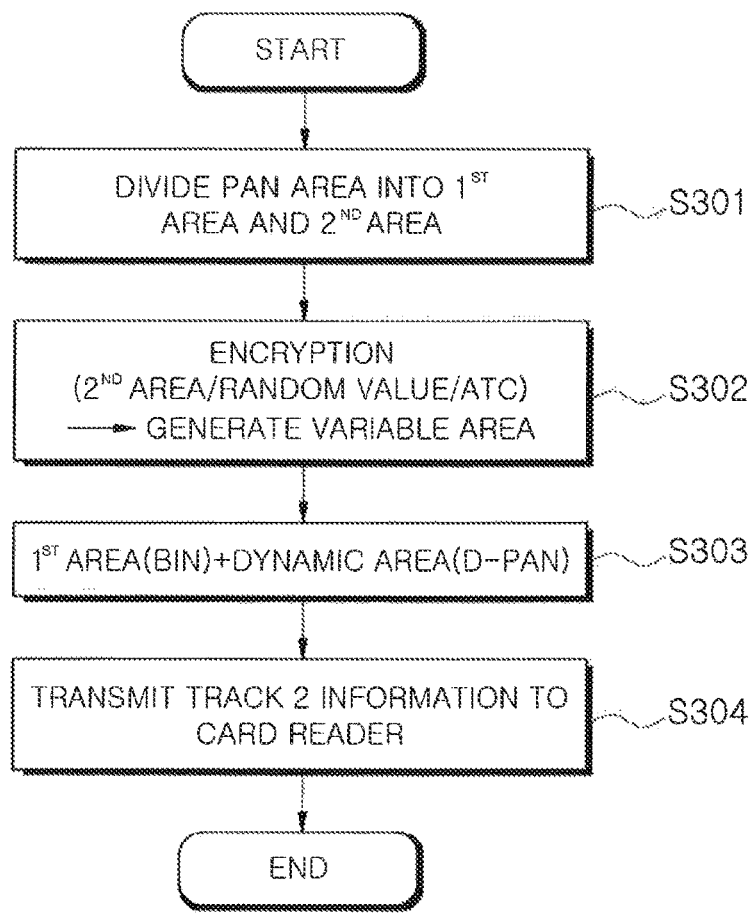
FIG. 7 illustrates a flow diagram for a transaction processing method using a dynamic PAN according to an embodiment of the present invention.

FIG. 7 illustrates a flow diagram for a transaction processing method using a dynamic PAN according to an embodiment of the present invention.

FIG. 7 is described with reference to FIGS. 2 to 6, and the reference numerals in FIGS. 2 to 6 can be referred to. However, for convenience of the description and understanding, a payment device is referred to by a reference numeral 50 illustrated in FIG. 2.

When a payment device 50 is an electronic credit card or a portable terminal in which a USIM chip is embedded, and when a card reader 20 can perform a local area communication with the electronic credit card or the portable terminal, the card reader 20 may check whether the electronic credit card or the portable terminal is located within an operation field. The operation field is a distance allowing communication between the payment device 50 and the card reader 20, and it may range from several to dozens of centimeters. However, the distance of the operation field can be increased depending on performance improvement in the card reader 20 or the payment device 50. In the case of a magnetic credit card that requires contact between the card reader 20 and the payment device 50, the operation field may mean a contact state. Except for the magnetic credit card, when the payment device 50 is an electronic credit card or a portable terminal, the operation field may range from several to dozens of centimeters.

When a payment device 50 is touched on or placed close to a card reader 20, the card reader 20 requests track 2 information by transmitting a Read Record command to the payment device 50 at step S303. In response to the Read Record command, the payment device 50 transmits the track 2 information to the card reader 20, and the card reader 20 obtains the track 2 information from the payment device 50 at step S304.

Because an electronic credit card provides track 2 information to a card reader 20 in the distance from several to dozens of centimeters, there is no concern that track 2 information is leaked in the section in which the track 2 information is transmitted from the payment device to the card reader 20. Track 2 information can be leaked when it is transmitted from a card reader 20 to a relay server 150 or to a card company server 100, or can be leaked from a receipt printed by the card reader 20.

Next, after extracting a PAN area from the track 2 information that is obtained from the payment device 50, the card reader 20 divides the PAN area into a first area and a second area at step S305. The PAN area may include a BIN and information about a credit card account. The first area includes the BIN that consists of 4 to 10 bytes, and the second area may include data of the remaining PAN area excluding the BIN. According to such a division, the card account is not exposed from the PAN information that is transmitted from the card reader 20 to the relay server 150 or the card company server 100.

On the other hand, when the payment device 50 is an electronic credit card, among 16 digits of numbers that are embossed or engraved on a surface of the electronic credit card, first 8 digits correspond to the first area, and the remaining 8 digits may correspond to the second area. In Korea, because first 8 digits of 16 digits of numbers embossed or engraved on a surface of an electronic credit card correspond to a BIN and the remaining 8 digits include information about a card number, the 16 digits of numbers may be referred to a PAN.

Next, the payment device 50 operates by being powered from a radio wave that is provided to the card reader 20, and may encrypt the second area at step S306.

The payment device 10 generates an encryption value by inputting an ATC and the time when a transaction is triggered by the payment device 50 or an arbitrary random value generated when a transaction occurs as variables of an encryption algorithm. In this case, the generated encryption value may correspond to a value of the second area.

Here, the Application Transaction Count (ATC) corresponds to a sequence number for a payment request, which is assigned by a card company server 100 when the payment device sends the payment request to the card company server 100. Also, the time when a transaction occurs may be regarded as an arbitrary time. Accordingly, if a number or a sequence of numbers generated in the arbitrary time when a transaction occurs is referred to a random value, the encryption algorithm can encrypt the second area by receiving the ATC and the random value as input variables.

Because of such an encryption, though a third party acquires the printed receipt or intercepts the PAN transmitted from the card reader 20 to the relay server 150 or to the card company server 100, it is practically difficult for the third party to find out the ATC assigned to the payment device 50 and the random value that is arbitrarily generated when a transaction occurs.

It is difficult to decrypt the encrypted second area unless variables (an ATC and a random value in the present invention) of an encryption algorithm are ascertained. Furthermore, when the encryption algorithm is DES or IDES, not only a decryption algorithm but also a master key for executing the decryption algorithm is required to decrypt the encrypted second area. In this case, it is desirable that the master key is arranged only in the card company server 100, and because others cannot find out the master key, an actual value of the second area is not exposed outside.

Next, the card reader 20 forms a dynamic PAN (D-PAN) at step S307 by combining the unencrypted first area and the second area that is dynamically changed whenever it is encrypted, and then may request transaction processing by providing the dynamic PAN to a finance company server (for example, a relay server 150 or a card company server 100).

Figure 8:
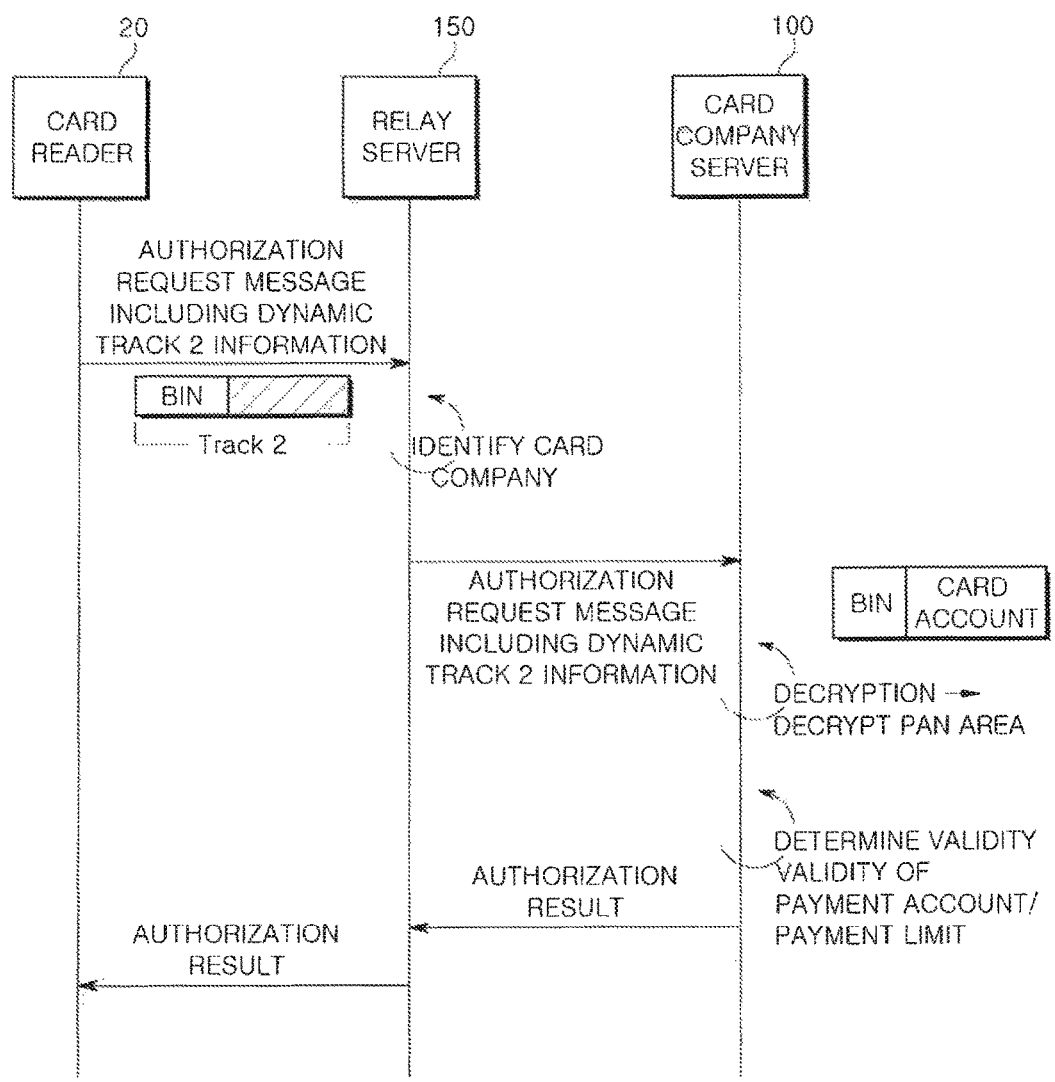
FIG. 8 illustrates a flow diagram for a transaction processing method using a dynamic PAN that is generated in FIG. 7.

FIG. 8 illustrates a flow diagram for a transaction processing method using a dynamic PAN that is generated in FIG. 7.

Referring to FIG. 8, first, when a card reader 20 is contacted with or placed close to a payment device 50, the card reader 20 transmits a radio wave to the payment device 50 and the payment device 50 may be powered on by using the radio wave as actuating power. The payment device 50 extracts a PAN area from the track 2 information within the payment device, and may encrypt a remaining area that excludes a BIN from the extracted PAN area, using an encryption algorithm (any one selected among AES, RSA, DES, IDES, and ARIA algorithms).

In this case, the payment device 50 may use a time when starting data communication with the card reader 20 as a random value, or may arbitrarily generate a random value when starting data communication with the card reader 20. Also, the payment device 50 encrypts the second area using the generated random value and an ATC as variables, and may generate a dynamic PAN by combining the encrypted second area with the first area including a BIN.

Because a dynamic PAN uses a random value that consists of a number or a sequence of numbers arbitrarily generated when or after a payment device 50 contacts with a card reader 20, though the random value is generated by a single payment device 50, it is difficult to generate the same random value consecutively.

On the other hand, when the same random value is consecutively generated, the payment device 50 may generate a random value again to obtain a different random value.

Dynamic track 2 information is formed by combining the dynamic PAN with a remaining area of the track 2 information (for example, an ED area, an SC area, and a DD area).

The payment device 50 provides the dynamic track 2 information to the card reader 20, and the card reader 20 generates an authorization request message that includes the dynamic track 2 information, the payment amount to be paid by the payment device 50, and affiliation membership information of the card reader 20. Then, the card reader 20 may provide the generated authorization request message to the relay server 150.

The relay server 150 obtains the dynamic track 2 information from the authorization request message provided by the card reader 20, extracts the first area from the dynamic track 2 information, and reads the BIN recorded in the first area.

Based on the BIN obtained from the unencrypted first area, the relay server 150 determines a card company to which the authorization request message is transmitted, and transmits the authorization request message, which is obtained from the card reader 20, to the corresponding card company server (for example, the reference numeral 100).

In this case, as the relay server 150 may not ascertain the content of the second area, which is the encrypted dynamic area, though the authorization request message provided from the card reader 20 to the relay server 150 is exposed outside, it is difficult for others to determine the message.

The card company server 100 decrypts the dynamic track 2 information obtained from the relay server 150. The decrypted dynamic track 2 information constitutes the original track 2 information according to ISO/IEC 7813 standards, and a card account is included in it. In other words, the card company server 100 decrypts the dynamic track 2 information into the original track 2 information that has been provided from the payment device 50 to the card reader 20.

The card company server 100 reads a card account from the decrypted track 2 information, and determines whether the card account is a valid card account for the payment and whether the requested payment amount included in the authorization request message exceeds a payment limit. When the card account is valid and the payment amount included in the authorization request message is within the payment limit, the card company server 100 transmits an authorization message to the relay server 150 and the relay server 150 may provide the card reader 20 with the authorization message obtained from the card company server 100.

Figure 9:
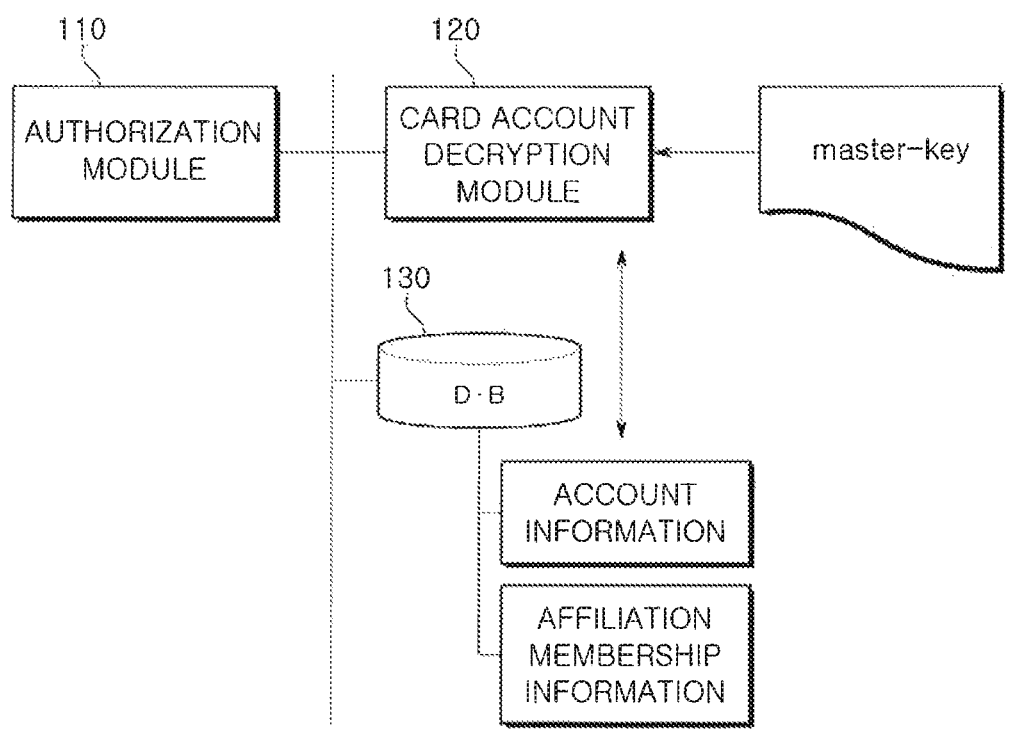
FIG. 9 illustrates a block diagram according to an embodiment of a card company server.

FIG. 9 illustrates a block diagram according to an embodiment of a card company server.

Referring to FIG. 9, a card company server 100 may be configured to include an authorization module 110, a card account decryption module 120, and a database 130.

The card account decryption module 120 receives an authorization request message including ISO/IEC 7813 standards of track 2 information from a card reader 20, and transforms the dynamic track 2 information, which has ASCII values for the second area, into hexadecimal values. Then, the card account decryption module 120 may decrypt the track 2 information that is transformed into hexadecimal values.

If the dynamic track 2 information is encrypted using a DES or IDES algorithm, the card account decryption module 120 may decrypt the encrypted dynamic track 2 information by running the DES or IDES algorithm using a prepared master key in reverse order.

The database 130 has information about customer card accounts. The customer card account stored in the database 130 may include information about an expiration date and payment limit for each of the card accounts.

The authorization module 110 determines whether a card account extracted by the card account decryption module 120 is a valid account and whether the requested payment amount in the authorization request message is within a payment limit allowable by the card account. As a result of the determination, when the requested payment amount in the authorization request message exceeds the payment limit, the authorization module 110 transmits to a relay server 150 a message for rejecting authorization of the authorization request message. The relay server 150 provides the message to the card reader 20 to cancel the transaction corresponding to the authorization request message.

Conversely, when the card account included in the authorization request message is valid and the payment amount included in the authorization request message is within the payment limit, the authorization module 110 writes an authorization message and transmits it to the relay server 150. Then, the relay server 150 may process the payment request of the card, which corresponds to the authorization request message, by providing the authorization message to the card reader 20.

INDUSTRIAL APPLICABILITY

The present invention may improve security of credit cards without changes in existing payment infrastructures. The present invention may contribute to expansion of credit card companies that issue and distribute credit cards, banks, and the finance industry that supports credit involved with credit card companies and banks.

The invention claimed is:

1. A method for processing a transaction using a dynamic PAN (Primary Account Number), which is performed by a payment device that provides a card reader with ISO (International Standardization Organization) standards of track 2 information, comprising:
   dividing a PAN area of the track 2 information into a first area, in which a BIN (Bank Information Number) is included, and a second area, in which the BIN is not included;
   forming a dynamic area by encrypting the second area;
   forming a dynamic PAN area by combining the first area with the dynamic area; and
   providing track 2 information including the dynamic PAN area to the card reader.

2. The method of claim 1, wherein the dynamic PAN area is dynamically encrypted by using as a variable, any one of an ATC (Application Transaction Count) and a random value that the payment device generates whenever payment is made.

3. The method of claim 1, further comprising, after forming the dynamic PAN area, forming a first format of data by converting the dynamic PAN area into an ISO format.

4. The method of claim 3, further comprising, after forming the first format of data, forming a second format of data by encrypting the first format of data.

5. The method of claim 1, wherein the track 2 information includes the BIN, an Expiration Date (ED) area, a Service Code (SC) area, and a Discretionary Data (DD) area.

6. The method of claim 1, wherein the dynamic area is generated by an encryption algorithm that uses a value of the second area of the PAN, the random value, and the ATC as variables, and the encryption algorithm is any one of AES (Advanced Encryption Standard), RSA (Rivest, Shamir, Adleman), DES (Data Encryption Standard), TDES (Triple DES), and ARIA (Academy Research Institute Agency).

7. The method of claim 1, wherein the payment device is any one of an electronic credit card and a portable terminal.

8. The method of claim 7, wherein the portable terminal provides the track 2 information to the card reader, using NFC (Near Field Communication).

9. The method of claim 8, wherein the portable terminal has any one of a USIM chip integrated with an NFC chip for the NFC and a finance chip for financial transactions.

10. The method of claim 1, wherein the first area ranges from 4 bytes to 10 bytes.

11. The method of claim 1, wherein the random value is generated in the payment device when a transaction occurs between the payment device and the card reader.

12. The method of claim 1, wherein the payment device is an electronic credit card in which IC (Integrated Circuit) is embedded.

13. The method of claim 12, wherein the payment device has a finance chip for financial transactions.

14. The method of claim 1, wherein the payment device is a portable terminal including a USIM (Universal Subscriber Identity Module) chip.

15. The method of claim 14, wherein the USIM chip is integrated with an NFC chip.

16. The method of claim 1, wherein the track 2 information, in which the first area is unencrypted, is formed by encrypting the remaining area that excludes the first area from the track 2 information.

17. The method of claim 1, wherein in the track 2 information, only the second area is encrypted and the remaining area excluding the second area is not encrypted.

18. The method of claim 1, wherein the PAN area of the track 2 information is a card number assigned to the payment device.

\* \* \* \* \*